(12) United States Patent
van Bassen

(10) Patent No.: US 12,342,762 B2
(45) Date of Patent: Jul. 1, 2025

(54) ROUND BALER WITH STARTER ROLL AND ELASTICALLY DEFLECTABLE DEFLECTOR ELEMENT

(71) Applicant: Maschinenfabrik Bernard Krone GmbH & Co. KG, Spelle (DE)

(72) Inventor: Aloys van Bassen, Freren (DE)

(73) Assignee: Maschinenfabrik Bernard Krone GmbH & Co. KG, Spelle (DE)

( * ) Notice: Subject to any disclaimer, the term of this patent is extended or adjusted under 35 U.S.C. 154(b) by 659 days.

(21) Appl. No.: 17/721,755

(22) Filed: Apr. 15, 2022

(65) Prior Publication Data

US 2022/0330487 A1    Oct. 20, 2022

(30) Foreign Application Priority Data

Apr. 16, 2021    (DE) ...................... 10 2021 109 629.4

(51) Int. Cl.
*A01F 15/10*    (2006.01)

(52) U.S. Cl.
CPC .................. *A01F 15/106* (2013.01)

(58) Field of Classification Search
CPC ............... A01F 15/106; A01F 15/18
See application file for complete search history.

(56) References Cited

U.S. PATENT DOCUMENTS

| | | | | |
|---|---|---|---|---|
| 4,034,543 A * | 7/1977 | Voth | ........................ | A01D 89/00 100/189 |
| 4,275,550 A * | 6/1981 | Swenson | ............... | A01F 15/101 100/189 |
| 4,335,563 A * | 6/1982 | Rice | ........................ | A01F 12/16 460/106 |
| 4,335,564 A * | 6/1982 | Knepper | ................. | A01F 12/16 460/106 |
| 4,446,875 A * | 5/1984 | Deleu | ..................... | A01F 12/16 460/106 |
| 5,186,683 A * | 2/1993 | Farley | ..................... | A01F 12/16 460/105 |
| 5,228,280 A | 7/1993 | Ratzlaff et al. | | |

(Continued)

FOREIGN PATENT DOCUMENTS

| | | | | |
|---|---|---|---|---|
| DE | 2419141 A | * 10/1975 | ............ | A01F 12/16 |
| DE | 19928521 A1 | * 1/2001 | ............ | A01F 15/10 |

(Continued)

*Primary Examiner* — Arpad Fabian-Kovacs
(74) *Attorney, Agent, or Firm* — Gudrun E. Huckett

(57) ABSTRACT

A round baler has a feed channel, a bale chamber, and a starter roll. The starter roll is arranged at an inlet side of the bale chamber and driveable about an axial roll axis in rotational direction. The starter roll feeds a crop flow from the feed channel to the bale chamber for bale formation. A catch device is provided for catching falling material. A tangentially extending catching chamber is formed between the catch device and the starter roll. The starter roll engages material in the catching chamber and feeds the material back to the crop flow. The catch device has a deflector element that, in a rest position, delimits the catching chamber at least in sections radially outwardly. The deflector element is elastically deflectable at least radially outwardly from the rest position such that an exit opening for the material from the catching chamber is produced or expanded.

9 Claims, 2 Drawing Sheets

(56) References Cited

U.S. PATENT DOCUMENTS

| | | | | |
|---|---|---|---|---|
| 5,819,517 | A * | 10/1998 | Amanatidis | A01D 90/04 198/723 |
| 5,913,805 | A * | 6/1999 | Vodon | A01F 15/07 100/88 |
| 8,206,205 | B2 * | 6/2012 | Derscheid | A01D 75/182 701/50 |
| 10,485,182 | B2 * | 11/2019 | Devroe | A01F 15/101 |
| 10,588,272 | B2 * | 3/2020 | Devroe | A01F 17/02 |
| 11,191,216 | B2 * | 12/2021 | McHale | B65G 19/04 |
| 11,382,277 | B2 * | 7/2022 | Kraus | A01F 15/10 |
| 2005/0198934 | A1 * | 9/2005 | Johnson | A01F 15/106 56/341 |
| 2006/0277883 | A1 * | 12/2006 | Berger | A01D 75/187 56/10.2 J |
| 2020/0404855 | A1 | 12/2020 | Frey et al. | |

FOREIGN PATENT DOCUMENTS

| | | | | |
|---|---|---|---|---|
| EP | 0339733 A1 * | 11/1989 | | A01F 12/16 |
| EP | 0532072 A1 * | 3/1993 | | A01F 12/16 |
| EP | 2 556 744 | 2/2013 | | |
| EP | 3005854 A1 * | 4/2016 | | A01F 15/0705 |
| EP | 3545752 A1 * | 10/2019 | | A01F 15/101 |
| GB | 2185871 A * | 8/1987 | | A01F 12/16 |
| WO | WO-2015028854 A1 * | 3/2015 | | A01F 12/16 |

\* cited by examiner

ROUND BALER WITH STARTER ROLL AND ELASTICALLY DEFLECTABLE DEFLECTOR ELEMENT

BACKGROUND OF THE INVENTION

The present invention concerns a round baler comprising a feed channel, a bale chamber, a starter roll arranged at the inlet side of the bale chamber and drivable about an axial roll axis in a rotational direction, which is configured to feed a crop flow from the feed channel to the bale chamber for bale formation, as well as a catch device for falling material, wherein between the catch device and the starter roll a tangentially extending catching chamber is formed, and wherein the starter roll is configured to engage material in the catching chamber and feed it again to the crop flow, wherein the catch device comprises at least one deflector element that, in a rest position, delimits the catching chamber at least in sections thereof radially outwardly and is elastically deflectable from the rest position at least radially outwardly.

Harvesting machines are used in agriculture in order to collect crop such as e.g. hay or straw and, as needed, process it further. The further processing can include inter alia comminuting, pressing and/or packaging or tying the crop. In case of a baler, the crop is compressed to bales (e.g., round bales or square bales) that can be subsequently wound around by a tying material. As tying material, cords, nets or films (e.g., in case of grass) can be used wherein the latter can be applied also outside of the bale press in a separately provided bale winding device. In a round baler, the crop is normally collected by a pick-up from the ground and transferred farther to a conveying rotor or cutting rotor that conveys the crop through a feed channel to the bale forming chamber or bale chamber where the actual compression is carried out. Here, press elements are acting on the crop that also act as conveying elements and generate a circulating movement of the crop. In case of balers with variable chamber, the effective size of the chamber is adapted to the increasing quantity of crop, wherein at least one endlessly circulating press element that as a whole is flexible defines a major portion of the bale chamber. The press element can be formed e.g. as a rod-chain conveyor with circulating chains and intermediately positioned rods or can comprise one or normally a plurality of press or baler belts. The respective baler belt is guided across a plurality of guide rollers so that it is maintained under tension and is driven in operation of the round baler in accordance with a circulating movement. At the transition from the feed channel to the bale chamber, a starter roll can be arranged that at the start of the bale formation conveys the crop directly against the circulating pressing element (e.g., the baler belts) and, during the further course, against the successively growing crop bale.

In order to promote in particular the start of the bale formation, the baler belts are comparatively closely guided along the starter roll. However, an intermediate space remains in any case through which a portion of the crop that is not adhering immediately to the bale can fall. In order to prevent that this crop is lost, below the starter roll or below the intermediate space a catch device is often provided, e.g. a catch plate. The latter catches the falling crop and also promotes that the caught crop is engaged by the starter roll and can be fed again to the bale.

It happens repeatedly that the round baler collects, together with the crop, also foreign matter such as stones which are entrained in the crop flow. Inasmuch as they are compressed together with the crop in the bale, this is in general not a problem. However, in particular stones can also drop into the catch device and accumulate therein. On the one hand, there is the risk that these stones are engaged again and are jammed between starter roll and catch device which can lead to damages. On the other hand, in particular the comparatively sensitive baler belts can be damaged in case they are guided across the stones during their circulating movement.

Object of the invention is to prevent damages by foreign matter in the region of a catch device of a starter roll.

SUMMARY OF THE INVENTION

The object is solved by a round baler that is characterized in that the at least one deflector element is elastically deflectable at least radially outwardly from the rest position in such a way that thereby an exit opening for material from the catching chamber is at least expandable.

Advantageous embodiments can be taken from the dependent claims.

For this purpose, a round baler is created, comprising a feed channel, a bale chamber, a starter roll arranged at the inlet side of the bale chamber and drivable about an axial roll axis in a rotational direction, which is configured to feed a crop flow from the feed channel to the bale chamber for bale formation, as well as a catch device for falling material, wherein between the catch device and the starter roll a tangentially extending catching chamber is formed, wherein the starter roll is configured to engage material in the catching chamber and feed it again to the crop flow.

The round baler is configured for pressing agricultural crop to round bales wherein the actual pressing process is realized in a bale chamber. The agricultural crop can be in particular stalk material such as grass, straw or hay. The term "round baler" includes in this context expressly also machines that, in addition to pressing of the crop to bales, also perform tying or packaging of the bales. The crop can be picked up by a pick-up and transported by a conveying device, e.g. a conveying rotor, farther in the direction of the bale chamber. Instead of a simple conveying device or in addition thereto, a cutting device can be provided that not only conveys the crop farther but cuts it also. In any case, a feed channel is provided through which the crop flow passes prior to reaching the bale chamber.

At the inlet side of the bale chamber, i.e., at an entry thereof, a starter roll is arranged. It serves generally for feeding the crop flow from the feed channel to the bale chamber for bale formation. In this context, the starter roll typically not only acts as a feed element but also as a press element that, in interaction with other elements of the round baler, exerts a pressure on the crop by means of which the compression is at least initiated. Insofar, the bale chamber can be delimited partially by the starter roll. The size of the bale chamber can be fixed or variable in the context of the invention. The starter roll is rotatable about an axis that is referred to here as roll axis and, by its course, defines an axial direction and thus also a radial and tangential direction. More precisely, the starter roll is drivable in a rotational direction so that it rotates about the roll axis. The roll axis extends normally parallel to the transverse direction (Y direction) of the round baler. In order to enable an effective conveyance of the crop, the starter roll can have a suitably profiled wall surface. The rotational direction or the sense of rotation of the starter roll is the direction in which the starter roll rotates in the operating state in accordance with its drive action.

Furthermore, a catch device for falling material is provided wherein the falling material is in particular crop and/or foreign matter that detaches from the crop flow without being pressed in the bale chamber. This can happen e.g. in relation to the crop flow downstream of the starter roll. The catch device is provided in order to catch this material. It can be arranged in particular horizontally (in transverse or length direction) adjacent to and/or vertically below the starter roll. Between the catch device and the starter roll, a tangentially extending catching chamber is formed, wherein the starter roll is designed to engage material in the catching chamber and feed it again to the crop flow. The catching chamber extends tangentially, i.e., across a certain angle range (e.g., between 90° and) 180° in circumferential direction about the roll axis. Of course, it extends also radially, i.e., a radial distance between starter roll and catching device is provided. Smaller objects or small quantities of crop can possibly remain initially in the catching chamber without being engaged. At least larger quantities of material, in particular crop, are however engaged by the starter roll and corresponding to its rotational movement fed again to the crop flow. Insofar, the catching chamber can also be referred to at least partially as a return chamber.

Furthermore, the catch device comprises at least one deflector element that in a rest position delimits the catching chamber at least in sections radially outwardly and can be elastically deflected at least radially outwardly from the rest position. This means that the catch device is not completely rigidly or stationarily configured but comprises at least one deflector element that comprises an elastic deflectability from its rest position. The rest position is the status or position that the deflector element assumes without being acted on by external forces. At least in this rest position, the deflector element delimits the catching chamber radially outwardly, namely at least in sections, i.e., the catching chamber can be delimited in other sections by other elements. The deflector element extends in the rest position in tangential direction across a certain angle about the roll axis. In this context, the deflector element is deflectable from the rest position at least in radial direction outwardly, optionally also in tangential and/or axial direction. This means that at least one part of the deflector element moves radially outwardly in case of corresponding force action and returns at the end of the force action into the rest position. The corresponding force action can originate e.g. from material which is located in the catching chamber, in particular foreign matter such as stones that are jammed between starter roll and deflector element. The elasticity can be selected such that in normal operation, when e.g. only crop is located in the catching chamber, no (appreciable) deflection is realized. When however e.g. foreign matter such as a stone is jammed, this leads to a significant deflection of the deflector element, one could also say the latter yields elastically. Thus, jammed foreign matter can be released again and can be transported away from the catching chamber e.g. by the starter roll. Foreign matter is not permanently jammed and does not remain over an extended period of time in the catching chamber. Thus, the risk of damage to the starter roll or other elements is significantly reduced.

According to the invention, at least one deflector element is elastically deflectable at least radially outwardly from the rest position in such a way that thereby an exit opening for material from the catching chamber is at least expandable, i.e., either expandable or producible. Due to the aforementioned exit opening, the material can exit from the catching chamber, i.e., it enables the exit of material from the catching chamber, e.g. downwardly, so that the material falls downwardly, following the force of gravity. This concerns primarily foreign matter that is admixed in the crop. In the rest position of the deflector element, the exit opening is either not present or smaller, e.g., so small that no appreciable material exit is possible. When the deflector element is deflected radially outwardly, an exit opening is produced in this way or it is enlarged, e.g. from a few millimeters to a few centimeters, so that also larger foreign matter such as stones can pass through and exit from the catching chamber. The exit opening is normally at least partially delimited by the deflector element, which includes the possibility that the exit opening can be opened within the deflector element. Due to the exit opening, the removal of foreign matter from the catching chamber is thus supported or enabled. Such foreign matter remains only temporarily in the catching chamber and then can exit therefrom through the exit opening, whereby the risk of damage of the starter roll or other elements is further reduced.

According to a typical embodiment, the round baler comprises at least one endless circulatingly drivable pressing element which delimits the bale chamber at least partially, wherein the catch device is arranged at least partially vertically below an intermediate space which is formed between the starter roll and the press element. The press element delimits the bale chamber in which the crop bale is formed and defines thus its effective size. In particular, it can be embodied as an endless baler belt, but alternatively however also e.g. as a rod-chain conveyor. In any case, it is drivable in circulation for which purpose it can be guided e.g. across a plurality of guide rollers of which at least one is connected to a drive. Between the press element and the starter roll an intermediate space is formed through which material can fall which is caught by the catch device arranged underneath. In order to support an effective formation of the bale, the distance between starter roll and press element should not be too large. This means, in turn, that the catching chamber is arranged at least in the vicinity of the press element so that foreign matter such as stones contained in the catching chamber also potentially pose the risk of damage to the press element. Precisely this danger can be reduced by a deflector element provided according to the invention. The aforementioned intermediate space can pass immediately into the catching chamber.

The elastic deflectability can be realized in that the deflector element is rigid in itself but is connected by an elastic element or spring element to a frame of the round baler. Preferably, at least one deflector element is however elastically deformable. This means that the corresponding deflector element is at least partially formed of an elastic material. The material can be selected as a function of different factors, e.g. cost, weight, load to be expected, desired elasticity etc. In particular, the deflector element can be comprised at least partially of an elastomer such as rubber or silicone. Elastomers permit the deflector element to elastically deform also in case of locally acting forces that do not effect an appreciable deflection of the deflector element as a whole, whereby damages and wear can be prevented.

Preferably, a first deflector element is arranged at least partially vertically below the starter roll. The term "vertical" is to be understood in this context in respect to the vertical direction of the round baler that is parallel or antiparallel to the direction of the force of gravity in normal orientation of the round baler. This arrangement can be advantageous for various reasons. Due to its own weight, foreign matter such as stones tends to move within the catching chamber to the lowest point which is typically located below the starter roll. In addition, the distance between starter roll and catch device in the bottom region is often particularly minimal so that the starter roll can optimally engage the crop and subsequently move it upwardly. The minimal distance makes it easier to e.g. push a stone with the starter roll in such a way against the deflector element that it is appreciably deflected. When such a deflector element is radially deflected, this corresponds to a deflection in downward direction (even though not necessarily vertically downwardly). In particular, the exit opening can be produced or expanded by deflection of the first deflector element.

An embodiment provides that the first deflector element extends tangentially in accordance with the rotational direction of the starter roll, starting at a first mounting region that is mounted positionally fixed. The first mounting region is a region of the first deflector element that is mounted directly or indirectly at the frame of the round baler and insofar is not deflectable or only deflectable to a negligible extent. For example, the first deflector element can be screwed on or clamped thereat. From this mounting region, the first deflector element extends in respect to the tangential direction according to the rotational direction of the starter roll. Normally, in this context the top part of the starter roll moves opposite to the travel direction and the bottom part in travel direction. In this case, the first deflector element that is arranged at least partially vertically below the starter roll extends from the rear to the front (in relation to the travel direction), even though in general not antiparallel to the travel direction. Simplified one could say that the first deflector element is oriented in the rotational direction and not opposite to the rotational direction. In the latter case, there would be the danger inter alia that the outermost end of the first deflector element is caught by the starter roll directly or indirectly, e.g., by a jammed stone, and bent opposite to its direction of extension. This is excluded in case of an extension in rotational direction.

Normally additionally, as needed also alternatively, a second deflector element can be arranged at least partially between the catching chamber and the press element. Functionally, one can speak of this second deflector element shielding the catching chamber relative to the press element, or vice versa. In this way, also foreign matter such as stones can be kept away better from the press element which is particularly important, for example, in case of a baler belt in order to prevent damage thereof. A function of the second deflector element can also reside in preventing that foreign matter can escape from the catching chamber on the side of the press element. Insofar, it may be preferred that the second deflector element is arranged at least in sections at a minimal distance to the press element. In this context, even a contact between the press element and the second deflector element is possible because the latter, due to its elastic deflectability, can yield without damaging the press element or itself. Normally, no exit opening is producible or expandable by radial deflection of the second deflector element.

Preferably, from a second mounting region that is mounted positionally fixed, the second deflector element extends in the direction toward a neighboring section of the press element, at an acute angle relative to a movement direction of the press element in the neighboring section. The second mounting region is a region of the second deflector element that is directly or indirectly mounted at the frame of the round baler and insofar is not, or only negligibly, deflectable. Here, the first deflector element can be screwed on, clamped on or fastened in other ways. From this mounting region, the second deflector element extends in the direction toward a neighboring section of the press element. The neighboring section is generally the section relative to which the second deflector element is closest. Inter alia, it can even contact the neighboring section which is not a problem, as described above, because the deflector element can yield elastically. A minimal distance between the second deflector element and the press element or the neighboring section is advantageous in order to prevent crop as well as foreign matter from exiting from the catching chamber. Foreign matter such as stones could otherwise move between the second deflector element and the press element at this location and e.g. could damage the latter. Due to the movement of the press element, the latter is essentially passing along the second deflector element in the operating state so that sequentially always other parts of the press element form the neighboring section. When viewing the movement direction of the press element in the neighboring section (in the operating state), the second deflector element extends at an acute angle thereto, i.e., at an angle of less than 90°. The angle can be in particular less than 70° or less than 50°. The second deflector element is thus oriented "with" the movement direction of the press element so that it is prevented that the deflector element folds over or is bent in case it contacts the running press element. Thus, the second deflector element can be arranged at a minimal distance (e.g. a few millimeters) to the neighboring section or can even contact it at least temporarily. This improves, in turn, the demarcation of the catching region relative to the press element.

The catch device could be formed exclusively by one or a plurality of deflector elements. According to another embodiment, the catch device comprises a stationary catching element that is arranged adjacent to a deflector element, wherein by deflection of the deflector element an exit opening between the catching element and the deflector element is at least expandable. The catching element is stationarily mounted relative to the frame of the round baler and is not, or only to negligible extent, deflectable. It can be viewed as being rigid in comparison to the deflector element. It can be produced, for example, of metal as sheet metal part or a cast part. The catching element is arranged adjacent to a deflector element, at least when the latter is in the rest position. The distance amounts to normally at most a few millimeters in order to prevent that crop can pass through between the two elements. This includes also the possibility that the two elements contact each other. When the deflector element is deflected, an exit opening is produced thereby or it is enlarged, e.g., to a few centimeters, so that also foreign matter such as stones can pass through and exit from the catching chamber. The deflector element can act here like a door or flap that opens due to elastic deflection. The herein mentioned deflector element can be in particular an aforementioned first deflector element.

In order to prevent that, for example, crop is lost through the exit opening already for minimal deflection of the deflector element, the distance between catching element and deflector element on the one hand, as well as their respective geometry, on the other hand, can be adapted. According to an embodiment, the catching element comprises a radially extending flange section which is facing the deflector element. The flange section, on the one hand, can serve for mechanical stabilization of the catching element, e.g., when it is embodied as a sheet metal part. On the other hand, the effective expansion of the catching element in radial direction is however also enlarged.

Due to the radial expansion of the flange section, it can be preferably achieved that, for minimal deflection, the deflector element moves along the flange section and adjacent thereto in order to retain material at least primarily between flange section and deflector element and, for a greater deflection, moves away from the flange section in order to release material from the catching chamber through an exit opening between flange section and deflector element. This means that, when the deflector element is deflected minimally, the distance to the flange section remains initially still minimal so that at most a small exit opening is produced. Material, in particular larger foreign matter such as stones, can hardly pass the exit opening and is mostly retained. Only once the deflector element is further deformed, a significant exit opening is produced through which e.g. also stones can exit the catching chamber. For example, this can be the case when the deflector element moves past the flange section in radial direction. Alternatively or additionally, the expansion of the exit opening can result from the deflector element carrying out an arc-shaped bending and/or pivot movement, wherein the movement initially is realized approximately parallel to the flange section, but with increasing angle thereto during the further course, so that the distance increases significantly, in particular non-linearly.

BRIEF DESCRIPTION OF THE DRAWINGS

In the following, the invention will be described with the aid of Figures. The Figures are only exemplary and do not limit the general inventive concept.

PREFERRED EMBODIMENTS

Figure 1:
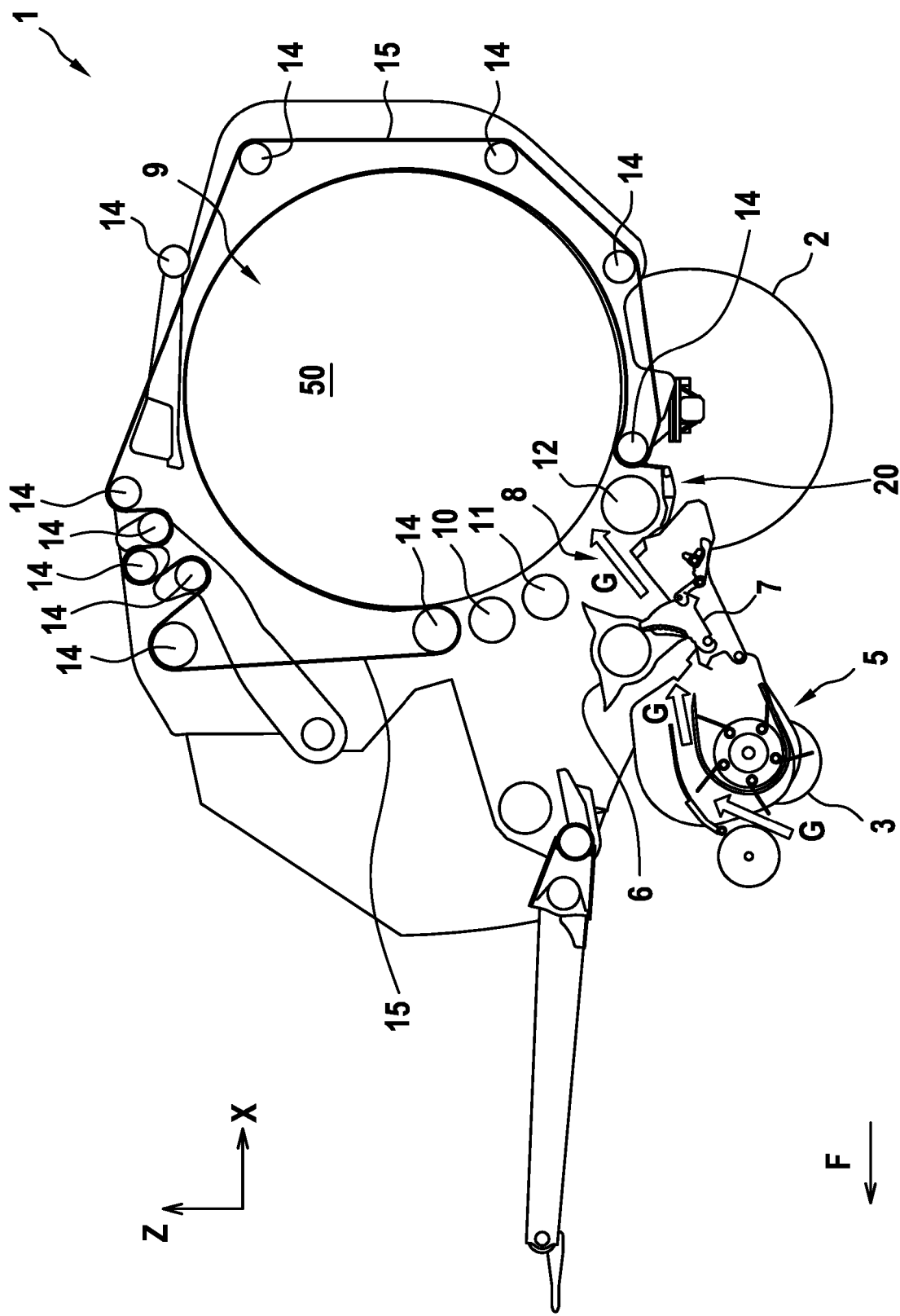
FIG. 1 shows a section illustration of a round baler according to the invention.

FIG. 1 shows a round baler 1 according to the present invention. The round baler 1 is configured in a known manner so as to be pulled by a towing vehicle or a tractor (not illustrated). The invention is however not limited to pulled or carried round balers 1 but comprises also self-propelled round balers 1. A length direction X of the round baler 1 is oriented opposite to the travel direction F to the rear and a vertical direction Z points upwardly. At a frame of the round baler 1, wheels 2 are rotatably supported on which the round baler 1 is resting. In travel direction F, a pick-up 5 can be seen at the front side that is supported on auxiliary wheels 3 and (in relation to FIG. 1) rotates in clockwise direction in operation. It serves to pick up crop 40, more precisely stalk material such as straw, hay or grass, off the ground and transport it farther. The crop 40 passes from the pick-up 5 to a cutting rotor 6 that rotates opposite to the clockwise direction. It comprises a plurality of tines which engage the crop 40, cut it in interaction with stationary blades 7, and transport it farther opposite to the travel direction F and slightly upwardly through a feed channel 8. Instead of the cutting rotor 6, also a conveying rotor could be used that only conveys the crop 40 and does not comminute it.

As a whole, a crop flow G runs from the pick-up 5 via the cutting rotor 6 and the feed channel 8 into a bale chamber 9 in which the actual bale formation and the compression of the crop 40 to a crop bale 50 is realized. For this purpose, three press rollers 10, 11, 12 as well as, as additional press elements, a plurality of endless baler belts 15 (arranged adjacent to each other perpendicular to the drawing plane) are provided which define the bale chamber 9 and enable a variable size thereof. The baler belts 15 are guided across a plurality of guide rollers 14, most of which are arranged at the inner side of the baler belts 15 and rotate in clockwise direction. At the inlet side of the bale chamber 9, relative to the feed channel 8 offset downwardly, a press roller 10-12 functioning as a starter roll 12 is provided. As can be seen in particular in the detail view of FIGS. 2 and 3, the starter roll 12 is drivable about an axially extending roll axis A in accordance with a rotational direction D, i.e., in relation to the Figures in clockwise direction. The starter roll 12 receives the crop flow G from the feed channel 8 and guides it to the bale chamber 9 for bale formation. The crop flow G extends in this context at the top side of the starter roll 12. At the start of bale formation, the bale chamber 9 is effectively substantially provided by an intermediate space 17 between the starter roll 12 and the baler belts 15. When the crop bale 50 grows, it is increasingly supported by the baler belts 15 as well as finally by the additional press rollers 10, 11. During bale formation, material 40, 41 drops again and again through an intermediate space 17 between the starter roll 12 and the baler belts 15. On the one hand, this is crop 40, on the other hand, however also foreign matter 41 such as stones. Such foreign matter 41 is compressed partially also within the crop bale 50; this is in principle not harmful.

Figure 2:
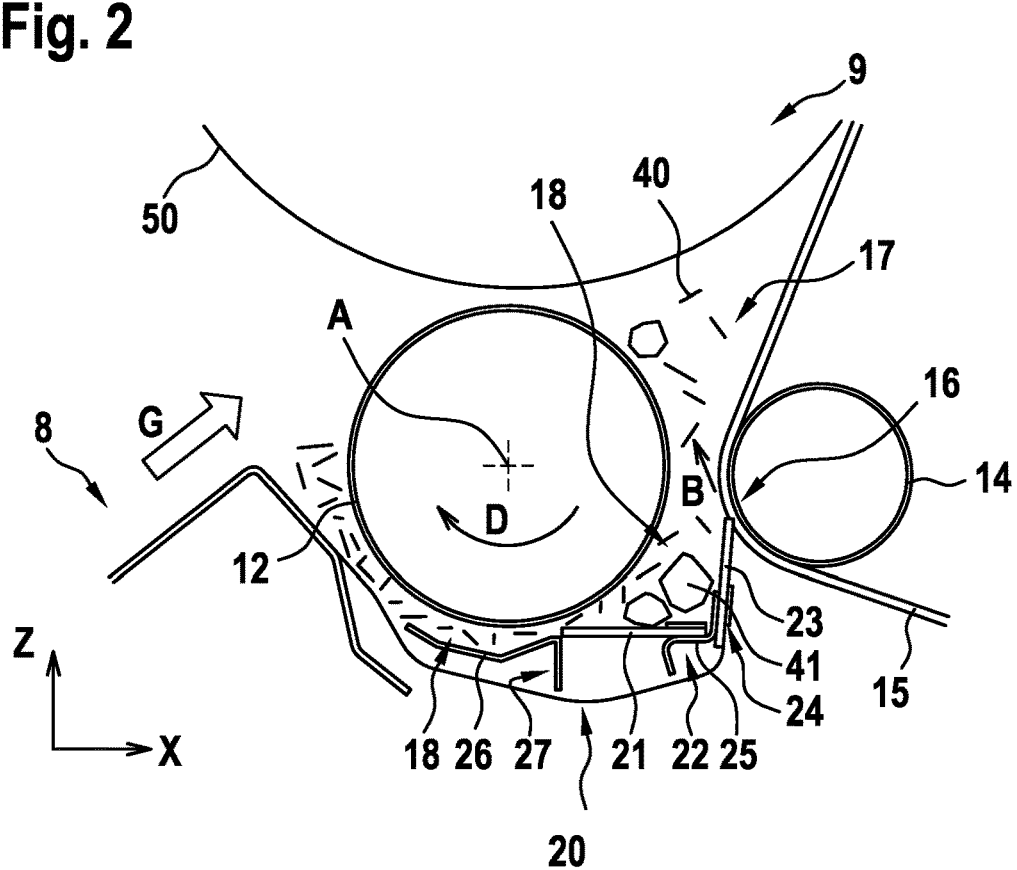
FIG. 2 shows a detail illustration of the round baler of FIG. 1 with a deflector element of a catch device in rest position.

In order to prevent an excessive loss of crop 40, below as well as horizontally adjacent (or in length direction X behind) the starter roll 12, a catch device 20 is arranged that is provided to catch falling material 40, 41. For this purpose, it is arranged partially vertically below the intermediate space 17. As a whole, between the catch device 20 and the starter roll 12, a tangentially extending catching chamber 18 is formed which adjoins the intermediate space 17. Falling material 40, 41 collects in the catching chamber 18 before it can be engaged by the starter roll 12 and fed again, corresponding to its rotational movement, to the crop flow G. Foreign matter 41 accumulated within the catching chamber 18 together with the crop 40, as indicated in FIG. 2, presents a potential problem. It could be jammed between the starter roll 12 and the catch device 20 and cause a blockage or damage. In case of significant quantities of foreign matter 41 such as stones in the catching chamber 18, there is in addition the danger that the baler belts 15 which are passing by in the vicinity could be damaged.

In order to avoid the aforementioned problems, the catch device 20 comprises two deflector elements 21, 23 which are each radially deflectable from a rest position, which is illustrated in FIG. 2. In the here illustrated embodiment, both deflector elements 21, 23 are formed by plate-shaped or strip-shaped rubber elements. They are each fastened at a stationary holder 25. A first deflector element 21 delimits together with a stationary catching element 26, in this case a catching plate, the catching chamber 18 in downward direction while a second deflector element 23 delimits the catching chamber 18 in rearward direction, toward the baler belts 15. The second deflector element 23 extends from a second mounting region 24 at the holder 25 to a neighboring section 16 of the baler belts 15. It can even contact this neighboring section 16 at least temporarily. In relation to a movement direction B of the baler belts 15 in this neighboring section 16, the second deflector element 23 extends (in its rest position) at an acute angle, in the present case approximately 45°. This course ensures that, upon a contact between the baler belts 15 and the second deflector element 23, no bending or folding over of the latter occurs. For this reason and due to the elasticity of the second deflector element 23, the latter can be arranged very closely to the bale belts 15 or even in contact therewith, whereby an optimal sealing action in this region is achieved so that hardly any crop 40 will be lost. As a whole, the second deflector element 23 shields the baler belts 15 also in relation to the catching chamber 18 so that e.g. the risk of a damage by foreign matter 41 such as stones is reduced.

Figure 3:
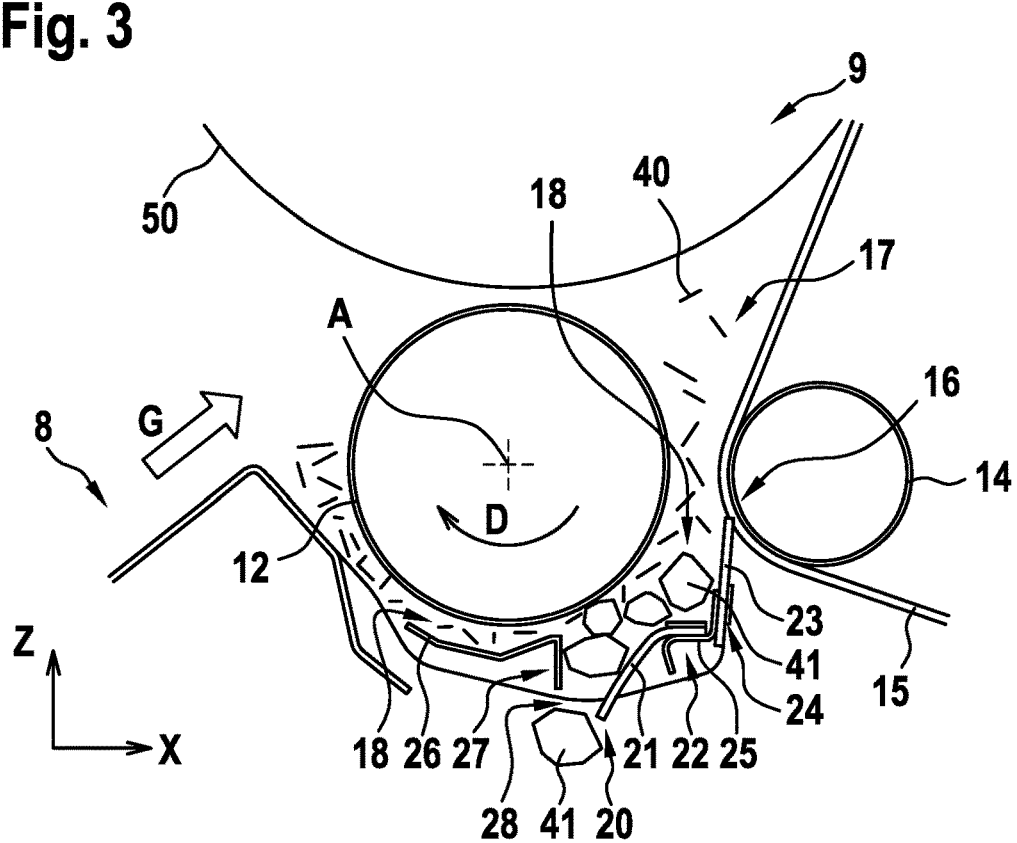
FIG. 3 shows a detail illustration corresponding to FIG. 2 with the deflector element in a deflected position.

In addition, the elastic structure of the second deflector element 23 enables an elastic yielding in case foreign matter 41 is jammed between the starter roll 12 and the second deflector element 23 and no blockage occurs; instead, the foreign matter 41 can pass in the catching chamber 18 father downwardly, for example, into the region between the first deflector element 21 and the starter roll 18. Here also no permanent jamming of the foreign matter 41 can occur because the first deflector element 21 can yield elastically, wherein finally, in the manner of a door that opens, it releases an exit opening 28 between it and the catching element 26, as illustrated in FIG. 3. Through this exit opening 28, foreign matter 41 can fall downwardly out of the catching chamber 18 where it can remain lying on the field, for example. As can be seen in FIGS. 2 and 3, the catching element 26 comprises a radially extending flange section 27 which is facing the first deflector element 21. It serves, on the one hand, for structural stabilization of the catching element 26; on the other hand, it ensures that for a minimal deflection of the first deflector element 21 no appreciable exit opening 28 is produced because the tip of the first deflector element 21 first moves along the flange section 27. Thus, crop 40 and foreign matter 41 are retained initially between deflector element 21 and flange section 27 and can collect or accumulate in front of the flange section 27. Only upon greater deflection, the exit opening 28 opens, as illustrated in FIG. 3, so that in particular previously accumulated foreign matter 41 such as stones can fall out of the catching chamber 18. Due to this essentially delayed opening, it is avoided that unnecessarily high amounts of crop 40 are lost.

What is claimed is:

1. A round baler comprising:
   a feed channel;
   a bale chamber;
   a starter roll arranged at an inlet side of the bale chamber and configured to be driven about an axial roll axis in a rotational direction, wherein the starter roll is configured to feed a crop flow from the feed channel to the bale chamber for bale formation in the bale chamber;
   a catch device configured to catch material that is falling down;
   a tangentially extending catching chamber formed between the catch device and the starter roll and configured to collect the material;
   wherein the starter roll is configured to engage the material in the tangentially extending catching chamber and to feed the material back to the crop flow;
   wherein the catch device comprises a first deflector element, wherein the first deflector element, in a rest position thereof, delimits the tangentially extending catching chamber at least in sections thereof radially outwardly;
   wherein the first deflector element is configured to be elastically deflected at least radially outwardly from the rest position such that an exit opening is produced or expanded through which the material can exit from the tangentially extending catching chamber;
   wherein the catch device comprises a stationary catching element arranged adjacent to the first deflector element, wherein the exit opening is produced or expanded between the stationary catching element and the first deflector element by an elastic deflection of the first deflector element resulting from a force action of the material located in the tangentially extending catching chamber.

2. The round baler according to claim 1, further comprising at least one endless press element that delimits the bale chamber at least partially and is configured to be circulatingly driven, wherein the catch device is arranged at least partially vertically below an intermediate space formed between the starter roll and the at least one endless press element.

3. The round baler according to claim 1, wherein the first deflector element is elastically deformable.

4. The round baler according to claim 1, wherein the first deflector element is arranged at least partially vertically below the starter roll.

5. The round baler according to claim 1, wherein the first deflector element, starting at a first mounting region that is mounted positionally fixed, extends tangentially according to the rotational direction of the starter roll.

6. The round baler according to claim 2, further comprising a second deflector element arranged at least partially between the tangentially extending catching chamber and the at least one endless press element.

7. The round baler according to claim 6, wherein the second deflector element, from a second mounting region that is mounted positionally fixed, extends in a direction toward a neighboring section of the at least one endless press element at an acute angle in relation to a movement direction of the at least one endless press element in the neighboring section.

8. The round baler according to claim 1, wherein the stationary catching element comprises a radially extending flange section facing the first deflector element.

9. The round baler according to claim 8, wherein, for a minimal deflection of the first deflector element, the first deflector element moves along the radially extending flange section and adjacent to the radially extending flange section and retains the material at least primarily at the radially extending flange section, and wherein, for a greater deflection of the first deflector element, the first deflector element moves away from the radially extending flange section and releases the material from the tangentially extending catching chamber through the exit opening between the radially extending flange section and the first deflector element.

* * * * *